(12) United States Patent
Alvarez

(10) Patent No.: US 7,050,887 B2
(45) Date of Patent: May 23, 2006

(54) WIRELESS SENSOR AND CONTROL TRANSMITTER SYSTEM

(75) Inventor: Raymond Michael Alvarez, Garden Grove, CA (US)

(73) Assignee: Techstream Control Systems Inc., Goodyear, AZ (US)

( * ) Notice: Subject to any disclaimer, the term of this patent is extended or adjusted under 35 U.S.C. 154(b) by 0 days.

(21) Appl. No.: 10/746,994

(22) Filed: Dec. 23, 2003

(65) Prior Publication Data

US 2005/0137752 A1    Jun. 23, 2005

(51) Int. Cl.
*G05D 7/00* (2006.01)
(52) U.S. Cl. .............. 700/284; 239/69; 137/624.11
(58) Field of Classification Search ............... 700/284; 239/63, 69, 542; 137/78.3, 624.11
See application file for complete search history.

(56) References Cited

U.S. PATENT DOCUMENTS

| | | | |
|---|---|---|---|
| 4,185,650 A | | 1/1980 | Neves |
| 4,209,131 A | * | 6/1980 | Barash et al. ............... 239/68 |
| 4,304,989 A | | 12/1981 | Vos et al. |
| 4,567,563 A | * | 1/1986 | Hirsch ........................ 700/284 |
| 5,173,855 A | | 12/1992 | Nielsen et al. |
| 5,333,785 A | * | 8/1994 | Dodds et al. ................ 239/69 |
| 5,414,618 A | | 5/1995 | Mock |
| 5,465,904 A | * | 11/1995 | Vaello ......................... 239/69 |
| 5,479,338 A | | 12/1995 | Ericksen |
| 5,870,302 A | * | 2/1999 | Oliver ......................... 700/11 |
| 5,921,280 A | | 7/1999 | Ericksen et al. |
| 5,927,603 A | * | 7/1999 | McNabb ...................... 239/63 |
| 6,102,061 A | | 8/2000 | Addlink |
| 6,227,220 B1 | | 5/2001 | Addlink |
| 6,453,215 B1 | | 9/2002 | Lavoie |
| 6,660,971 B1 | | 12/2003 | Smith |
| 6,823,239 B1 | * | 11/2004 | Sieminski ................... 700/284 |

OTHER PUBLICATIONS

Rainbird Cluster Control Unit Tech Specs, Jun. 2004.

(Continued)

*Primary Examiner*—Jayprakash N. Gandhi
(74) *Attorney, Agent, or Firm*—Law Office of Ken Dallara; Ken Dallara

(57) ABSTRACT

A passive wireless sensor and control transmitter subsystem is provided for operating irrigation or other hydraulic system. The system includes a master module unit hardwired to and in communication with an existing hydraulic system controller, and a field module unit that is hardwired to and in communication with field electromechanical control devices such as valves, solenoids and servo motors, and field sensors indicating, for example, atmospheric conditions. The master module unit and field module unit communicate with digital wireless communication and can act as a simple wireless bridge providing pass through data connectivity. The master module and field module units are capable of digitizing input signals from the devices to which they are hardwired and transmitting them to the opposite module; they are further capable of recreating the digitized signals received back into the analog form to reproduce the original input signal and communicating it to the device to which it is hardwired. Full duplex communication enables remote sensors to be hardwired to the field modules unit rather than directly to existing control apparatus, as well as being able to transfer valve, pump and relay status back to existing control apparatus. One embodiment enables the subsystem to receive sensor inputs and process them accordingly even though the hydraulic control system may not be capable of utilizing them. Supplemental functionality may be added to an existing hydraulic control system by including the WSCX and its system features of sensor functionality and control.

24 Claims, 6 Drawing Sheets

OTHER PUBLICATIONS

Toro Sentinel Series Controller Technical Brochure, Mar. 2004.
Orbit Superstar RF Technical Specs, Mar. 2004.
Hunter SRR Remote Control- Technical Specs Aug. 2003.
Rainbird One-Button Sequencing System Technical Spec, 2001.
Rainbird ESP-Site Satellite Series Controller Technical Spec, Sep. 2002.

Rainbird MDC 50-220 Decoder Installation Sheet, Oct. 2002.

* cited by examiner

FMU Unit

MMU Unit

WIRELESS SENSOR AND CONTROL TRANSMITTER SYSTEM

FIELD OF THE INVENTION

The present invention relates to water or fluid control systems such as an irrigation controller system. More particularly, the present invention relates to a retrofit for an existing controller system with a subsystem apparatus that provides a wireless communications link between almost any controller and the control valves or sensors of the system, replacing the wire paths that are typically required to connect them, that can also provide additional functionality to an existing control system.

BACKGROUND OF THE INVENTION

There are numerous types of automatic controllers that typically incorporate conventional motor-driven electric clocks or solid-state electronics or both technologies combined. These systems provide for individual start times for particular irrigation cycles and watering schedules and may include calendar programs that provide the ability to select particular days and distribution periods with these control units.

Solid-state irrigation controllers have been displacing the use of electromechanical controllers, particularly in larger applications. Solid-state controllers replace the electric motors, mechanical switches, pins, cams, levers, gears, and other mechanical devices with solid-state electronic circuitry that executes a programmed response and are typically much less expensive than electromechanical systems. Many prior art solid state stand alone irrigation controllers incorporate a programmable microprocessor computer with a user interface that enables the programming of different watering stations or zones based on variables such as daily, weekly, or biweekly start times, having differing watering lengths. Other variables that add "smart" system functionality may be programmed into such systems and can include the use of field sensors that can report a variety of environmental or system component conditions or states. These can also be referred to as "smart" controllers or stand-alone controllers. Central or centrally control system controllers usually include such "smart" system functionality.

Some controllers visually communicate the current status of the system's programmable variables by use of indicators such as liquid crystal displays, analog indicators or binary messages sent to a computer and graphically represented on screen using proprietary software. Audible and visual alarms to inform the user of malfunction conditions in a control system are used as well.

In a typical solid-state irrigation system the water supply to sprinklers of each watering zone is regulated by a remote control valve (RCV) having a solenoid that includes one or more sprinklers. An RCV controls the flow of water from a pressurized water source to the sprinklers of a given watering zone. Main or master control valves (MCV's) that regulate water flow to one or more RCV's may also be provided. The MCV can function as a fail-safe device should a waterline break or malfunction occur in the main line or an RCV or its line. RCV's and MCV's are types of supplemental field electromechanical control devices. Field sensors may also be provided so that in such systems sensor inputs can be interpreted by the microprocessor and newer controllers can respond to the inputs accordingly, by shutting down an MCV at the main water feed location to prevent water waste and property damage caused by a line break.

There are two significant types of control systems in use: the stand-alone controller and the centralized-satellite or remote control central system. Generally, the stand-alone controller is operated locally by a user and functions independently of any other controller or of any network communication system, as noted in U.S. Pat. No. 5,870,302 to Oliver issued on Feb. 9, 1999. '302 shows a host computer that analyzes data which after computing variables send data from the computer to the controller. In the irrigation market, these units are made as the Sentinel by The Toro Company or Maxicom by the Rainbird Corporation, and are designed for large field applications such as golf courses or municipalities. Data can also be directly input by the user, as noted in U.S. Pat. No. 5,921,280 to Ericksen on Jul. 13, 1999, where a user provides input via a handheld unit to the controller. These systems are marketed by The Orbit Corporation as Superstar RF, by Hunter Industries as SRR and by the Rainbird Corporation as the RM series. The remote control central system in contrast networks monitoring and control functions by communicating between a plurality of stand-alone controllers and a central, user-operated computer, as shown in U.S. Pat. No. 6,600,971 issued to Smith on Jul. 29, 2003. Central remote control system technology maximizes user efficiency by giving a single individual the capability to monitor and control a number of stand-alone controller devices simultaneously and thereby allow greater optimization of program schedules and water applications. The three prior art patents show hardwired or wireless control of the controller, but uses only hardwired connections to the actual sprinkler valves. The wireless controller only interfaces with the sprinkler controller and not the actual sprinkler valve directly.

Both stand-alone and central control systems can include field sensor devices to allow the monitoring and processing of signals generated by field sensors. They can also sense electrical current load conditions on each of their MCV and RCV wire leads. These control systems can be programmed to respond in specified ways depending upon the sensor inputs detected. This style of full duplex system is used to monitor valve status (open, closed, shorted) as well as the existing controller can sense current load conditions and compare it to what is anticipated by system parameters. If the existing controller does not sense a current load after energizing a valve, then the controller will know that the valve is not operating properly. It is important to understand that full duplex entails not only two way communication but also confirmation of the actual sending and receipt of information is monitored to ensure that the system is able to communicate properly.

Most control systems open or close valves or other devices by sending an electric current over a wire at a user-defined scheduled time interval. Some control devices have numerous connection points where several solenoid or other mechanically actuated valves can be attached or other types of devices that can be switched on or off with a relay. Similarly, signals generated from field sensor inputs, such as liquid flow, atmospheric, soil moisture content and other types can be received by contemporary controllers via dedicated wire paths.

Multiple stand-alone control systems are frequently used on larger land areas or properties, where multiple stand-alone controllers must be used because of the great distances that lay between controllers and valves. The additional controller units may be required because of limitations caused by electrical line impedance, the distance wire can be run and the maximum amount of electrical impedance, or because of the remote proximity to water supply lines or meters. Though expensive, it is usually substantially cheaper to place more controllers near a water supply line than it is to move the supply line closer to a controller. These types of irrigation systems therefore often require a greater number of control units, and at a greater expense, to adequately control the supply of water to far reaching areas. Larger property sites such as those used in cities, with highways, planned communities, golf courses, institutional or commercial facilities and the like, are difficult to maintain and manage because of the shear number of control points and the remote proximity between control units.

Central control technology was developed to improve the efficiency of managing the distribution of water to large areas and to provide fault detection and reaction capability, but all carry a substantial economic cost to the purchaser of such systems. The benefit of investment is significantly realized in larger locations where a single stand-alone or central control unit can have a very positive economic impact on a large area. The opposite, however, is true when installing the same system in a smaller area. Roughly, the same dollar investment must be made to control an irrigation system on a smaller land area, but with reduced possibility of return on investment, because the smaller property will not have as great a water waste or savings potential as a larger one.

However, though waste or savings potential may or may not be diminished, liability potential may be as great or greater depending upon the areas location. For example, a broken line in a bad location can cause substantial property or other collateral damage. Furthermore, most cities or large facilities are comprised of numerous smaller areas so when combined, can amount to significant total area or acreage. Managing acreage, again, becomes an important issue relative to use efficiency and waste minimization. Therefore, singularly or a combination of these two points make incorporating "smart" or central control technology features to smaller areas more critical and important.

Where there are numerous smaller areas within a larger site, such as a city, they are usually not included when converting several stand-alone control systems to a "smart" or central control system because of the high cost of retrofitting each control unit. By today's figures, a centrally controlled stand-alone control unit that communicates wirelessly to a host computer can cost between $6,000–$12,000; where as, a smaller single basic control unit without the capabilities of a larger "smart" stand-alone wireless system can cost 75%–95% less. Cities will place the more expensive "smart" stand-alone systems in larger areas and use the less expensive and subsequently less capable single control units, without connection to host computers, in smaller areas.

The present invention will enable cities and other large system users an economical alternative and option to forego the use of the more limited single control units by incorporating the feature content of the more capable "smart" system or a centrally controlled system by providing a wireless bridge that can connect the control requirements of the smaller areas into the functionality of "smart" systems employed in near-by larger areas. Further, retrofitting an existing stand-alone or central system to incorporate an MCV and field sensing inputs, processing and control capabilities is often neglected completely and not installed due to the high cost and difficulty that can be associated with laying wire to connect the devices. In retrofit applications, it is also not uncommon to encounter adverse site conditions which require trenching great distances or through established areas to complete wire runs. Many times roads, highways, severe elevation changes, buildings, bridges or a multitude of other types of structures must be traversed to run the necessary wire to add sensors or electromechanical devices such as MCV's or RCV's.

Modern irrigation controllers and central control system technology is designed to optimize watering efficiency, to minimize water waste and optimize the irrigation system for other environmental conditions that are associated with water waste, such as soil erosion. A solution is therefore needed to reduce the economic impact of incorporating these newer technologies into otherwise cost-prohibitive or difficult to impossible installation locations.

What is needed then is a subsystem that can be retrofitted or adapted to most any commonly available control system, whether stand-alone or central controlled, and produced by any manufacturer that will provide a wireless communication link between the existing control unit, which includes the monitoring and processing controls and capability to act upon those control inputs, and the existing electromechanical devices such as MCV's, RCV's, and field sensor devices that would otherwise require a hardwired connection.

What is also needed is a subsystem that provides the existing apparatus the capability to upgrade the functionality of an existing controller system without having to replace the existing controllers or other components of the system. Adding or retrofitting certain technology features to an existing system that lacks those features may provide a cost effective alternative to total system replacement, such as adding digital sensors to an analog control system or adding analog sensors to a digital system. It is the incompatibility between devices and controllers that communicate through different signal waveforms or interface protocols, analog versus digital, along with the difference between the proprietary controllers and devices unique to different manufactures, Toro versus Rainbird versus Hunter or Orbit, that makes retrofitting older systems very expensive and complicated. Moreover the end user, whether a municipality, an institution, or a commercial, communal or other user would benefit significantly because existing equipment would not need to be eliminated or replaced, so the user would not incur the loss of an initial investment, while availing the user of newer water-saving technology features. What is also needed is a method of converting an existing hardwired controller system to wireless technology while using all existing components and circuitry of any waveform and manufacturer.

SUMMARY OF THE INVENTION

A solution to the above problem has been devised. In one aspect of the invention, a Wireless Sensor and Control Transmitter System (WSCXS) is provided that functions as a wireless communication link which replaces the wiring or cabling section of an existing hardwired irrigation system between the existing controller and the sprinkler valve, actuators or solenoids. The WSCXS provides a communications bridge that repeats command transactions between an existing irrigation controller unit and existing distant irrigation system MCV's, RCV's and/or field sensors. The WSCXS receives command signals from almost any controller unit and digitizes the received signal to be executed upon the desired valve. Similarly, signals generated by field sensor devices are recreated for the controller unit. The existing controller unit then receives the duplicated signal from the WSCXS and records the data generated by the sensor, or responds in a preprogrammed fashion.

The WSCXS comprises two main modules, a Master Module Unit (MMU) and a Field Module Unit (FMU). The system employs radio frequency (RF) transceivers, on/off state function commands and sensor signal inputs that are communicated over an RF link rather than through wires. The WSCXS enables the transmission of signals and commands via a wireless communications bridge that can circumvent physical obstacles, structures or distances that would otherwise prohibit or make impractical a hardwired implementation. The WSCXS system is therefore a cost effective alternative to more expensive hardwire connection applications as detailed above.

The WSCXS is used with an existing irrigation system having an electromechanical or solid-state irrigation controller unit, made by any manufacturer. The existing irrigation controller may be designed to control field electromechanical devices such as MCV or RCV devices, that may contain electric actuators, motors or solenoids, as well as field sensors that operate with an analog or digital electrical signal, such as sensors that monitor water or fluid flow, atmospheric, precipitation or soil moisture content and others.

The MMU and FMU are complementary in function and communicate between themselves as transceivers and to the devices that they are hardwired to. Command and sensor signal inputs received by the WSCXS are converted into a digital signal format, and then are transmitted wirelessly to the other RF connected module. The digital RF signal is recreated in an analog format by the receiving module. The receiving module duplicates the original command output or signal transmission of the existing controller to the component, such as a valve, solenoid, actuator or sensor, hardwired to it to complete a transmission.

By way of example, the WSCXS may be used with an existing system that otherwise operates with analog communication between the system components. The MMU is hardwired to the outputs of the existing irrigation controller unit and the FMU is hardwired to the existing field MCV or RCV devices and/or field sensors. The MMU connects to either valve wire terminal strip or to cable connector pins on main board or output driver cards as an accessory add-on module device. The MMU digitizes the electrical output analog control commands of the existing controller unit then transmits the digital signals via an RF link to the FMU. Each FMU can be hardwired to a plurity of valves and sensors, in this embodiment up to 12 valves and 2 sensors, various MCV's, RCV's and/or other devices like relay switches that may be used in an irrigation system. The FMU receives the digitized command signals from the MMU, recreates them back into the original signal format from the irrigation controller and transmits them to the field components of the irrigation system to, for example, open or close of a valve or relay. Conversely, the FMU digitizes and transmits sensor signals from field sensors that are hardwired to it, such as data from water flow or moisture sensors. This full duplex form of communication can also be used to monitor the current draw or other attributes of valves and relays. When this digital signal is received by the MMU via RF transmission from the FMU, the MMU recreates the analog sensor signal and sends it to the existing irrigation controller unit for data logging, instantaneous viewing or alarm condition monitoring and detection functions. All FMU functions can be retrofitted to function with a single valve of any make, type that is produced by any manufacturer. The MMU/FMU interface includes all of the functions that are available in multiple wired valve devices, such as multiple power supply options, (12 VDC, 24 VAC, 120 VAC), integrated flow sensor input and transmission, valve activation, full duplex communication, current load sensing and event transmission, communication event acknowledgement confirmation and battery storage state sensing and transmission. The FMU connects as a modular device directly, as a hardwired connection, to the electrical component(s) of a valve and can be physically attached, via a plug, machined modification or as an adapted component to the valve's body or by coupling. The system preferably operates with full duplex communication, allowing simultaneous two-way communication.

This invention uses radio frequency (RF) or other airwave transmission means as a means of communicating between the FMU and MMU and that RF signal can be adapted to function as the application demands. Providing a broad selection of alternative wireless devices and communication interface platforms or standards allows this subsystem the ability to be economically and effectively adapted to most any physical location, environment or application. By way of example, installations of this subsystem invention not involving significant distances may only require the use of a ¼ or 1 watt radiated power output spread spectrum radio transceiver technology, while installations involving longer distances between MMUs and FMUs can require more radiated power output levels like two-watts in a 450 mHz frequency range. However, this invention includes the ability to connect many over-the-counter wireless communication devices via an RS-232 bus or other communication interface means that may be available, to connect digital radio devices, such as 27, 450, 928, 2600 or 3600 megahertz frequency ranges, or even cellular frequencies. Connections through the RS-232 interface or other communication bus enables the user to increase the range up to 50 miles or beyond depending on antennae parameters or wireless technology incorporated. Though differing in terms of application, scope and functionality, prior art controllers, heretofore described, do not have the ability to change wireless signal technologies to adapt to changes in use of their devices and controllers.

This embodiment of the present WSCXS invention eliminates the need for running wire between any controller system unit and any field electromechanical control devices and/or to field sensors. Existing prior art has the sensors, irrigation valves, solenoids, motors, electric actuators or the like attached directly to an existing controller unit and not to a fully duplexed wireless subsystem such as this invention that otherwise eliminates the need for direct wire connection.

An embodiment of this subsystem allows the incorporation and control of newly devised sensors, field electromechanical devices and methods of irrigation into an existing hydraulic, irrigation or water transfer control system, such as adding more efficient digital valves into an analog system. Aftermarket or previously incompatible field electromechanical control devices may then be incorporated into an existing irrigation system with the WSCXS, such as newly devised actuators, solenoids, relays, and servo motors. A much wider variety of aftermarket field sensors may likewise be implemented in an existing system using the WSCXS, allowing the addition, for example, of sensors measuring liquid flow, pressure or liquid level, atmospheric or weather related data, soil moisture content, water-borne contaminants or evaporation.

The use of previously incompatible electromechanical devices and sensors can modernize and add great economy and convenience to a fluid transfer, water or irrigation system, providing valuable feedback and improved control of the system. These devices may be incorporated into an existing system that would otherwise be incapable of implementing them or performing advanced functions.

This WSCXS can therefore be used to provide digital functionality when retrofitting an existing system, or installing a new system, without the need to excavate and run wires under roads, structures and other obstacles. The present WSCXS invention eliminates the need for wires between a controller unit and all types of field electromechanical control devices and field sensors. The WSCXS can also provide the ability to add an open-ended variety of supplemental functionality to an existing hydraulic or irrigation system.

Although the above summary and below description generally refer to irrigation systems for watering vegetation specifically, this is by way of illustration rather than limitation. The WSCXS can be used with any liquid transfer system that controls liquid or fluid flow, such as water, petroleum or petrochemical transfer systems.

DESCRIPTION OF THE INVENTION

The following description, and the figures to which it refers, are provided for the purpose of describing examples and specific embodiments of the invention only and are not intended to exhaustively describe all possible examples and embodiments of the invention. Many specific implementations of the following described WSCXS will be apparent to those of skill in the art.

Figure 1:
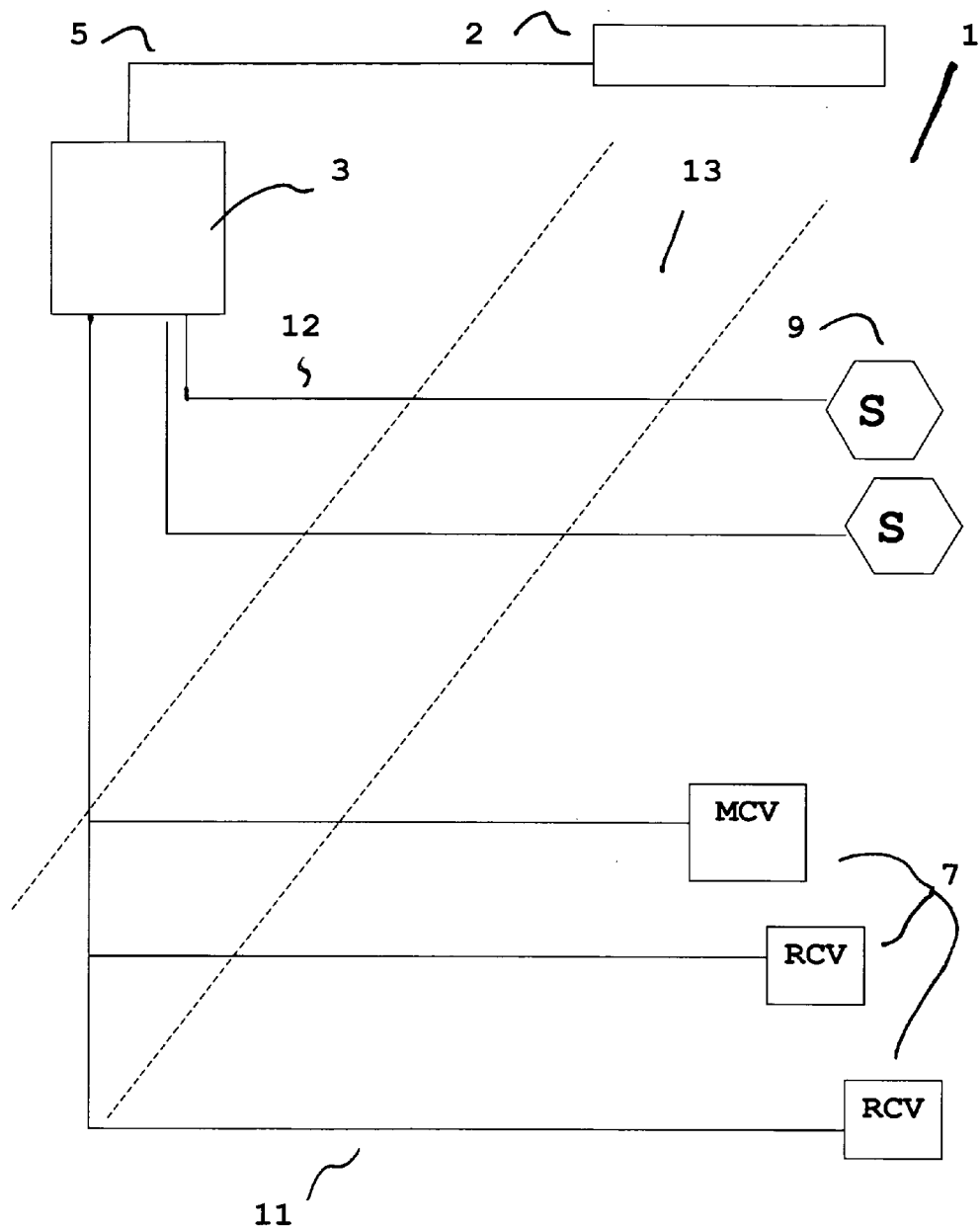
FIG. 1—This figure details the current state of the art of a controller attached with hardwires to valves and sprinklers.

FIG. 1 shows a typical solid-state centralized irrigation system 1 of the prior art. A central base personal computer 2 is connected via a communications link 5, to a solid-state controller unit 3. The controller unit 3 is connected to one or more field MCV, RCV or other relay type devices 7, and/or to field sensors 9, such as flow, soil moisture, and atmospheric or other devices by hardwires 11 and 12. The hardwired connections between the controller unit 3 and the other components 5, 7 and 9 frequently run under roads 13 (shown in dashed lines) or other structure.

Figure 2:
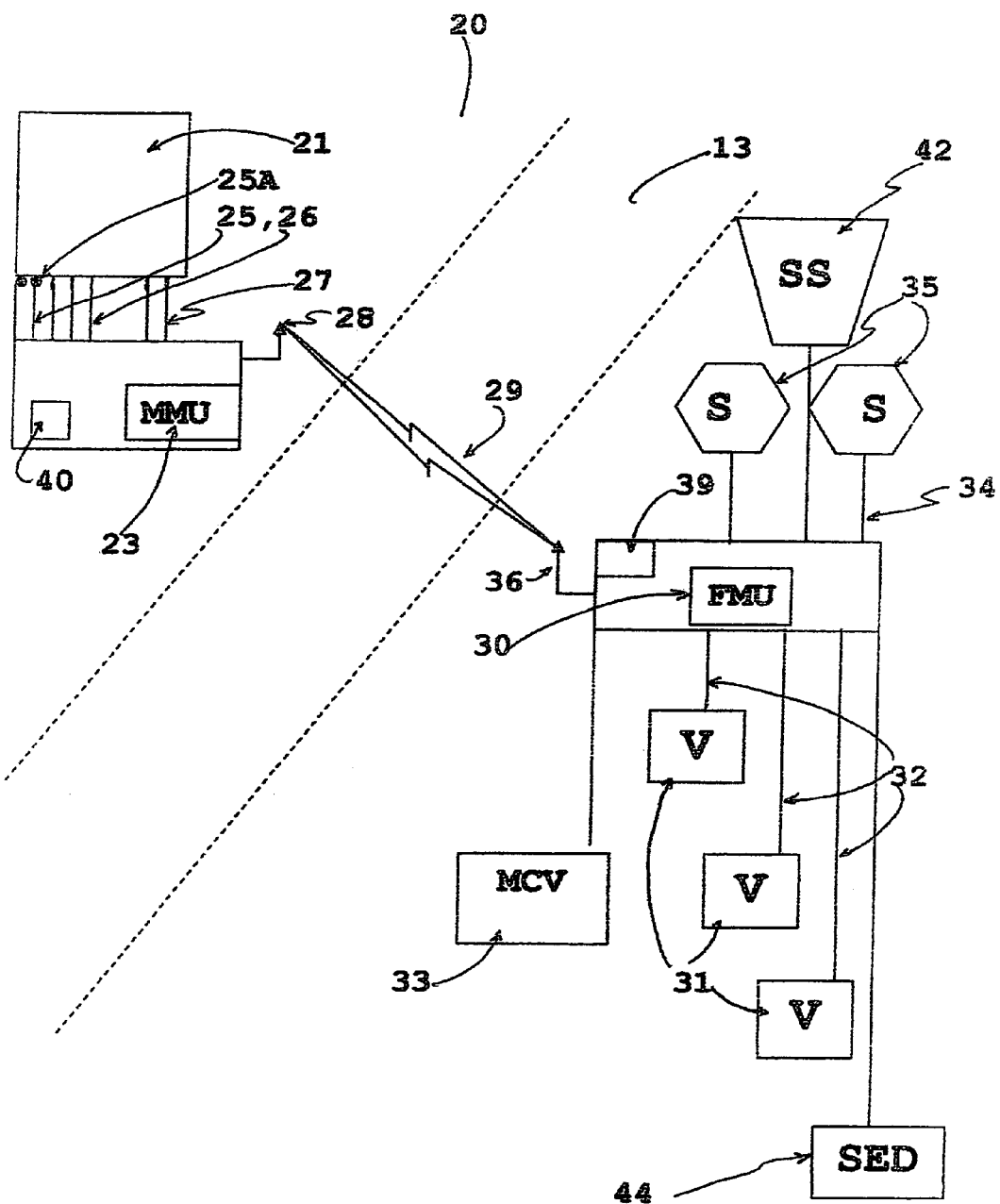
FIG. 2—This figure details the current invention where the Master Module Unit (MMU) communicates with Field Module Unit (FMU) using wireless means.

Referring now to FIG. 2, a diagram of an embodiment of the present invention is shown, an irrigation system employing a WSCXS 20. In this example an irrigation controller unit 21 is hardwired to a Master Module Unit (MMU) 23 from the output wire leads on the controller. The MMU 23 is further equipped with a full duplex RF radio transmitter/receiver and antenna 28 having an antenna that is in wireless communication with Field Module Unit (FMU) 30 that is likewise equipped with a full duplex RF radio transmitter/receiver 36 having an antenna that is in wireless communication with MMU 23.

The MMU 23 receives inputs from the existing controller's valve command outputs 25A then converts the input signals into a digital format that is then transmitted via the RF link 29 that exists between the MMU and FMU transceivers 28 and 36. The FMU 30 receives the digital signals then converts them again to return them into their original output format for transmission to their respective valve or relay devices 31 via a hardwire connection 32. The controller unit 21 is hardwired to the MMU 23 with one or more valve control wires 25, to control one or more valves 31 of a typical irrigation system.

In the present example the MMU 23 is powered by a connection 27 hardwired to the power supply of existing irrigation control unit 21. The MMU 23 may, for example, be powered by a direct connection to the MMU by a 24-VAC power supply from the power supply of a typical controller unit. The existing controller unit 21 is also hardwired to the MMU 23 with one or more sensor input wires 26. The MMU 23 outputs sensor signals into the controller's 21 sensor input hardwire connections 26. Field sensors 35 are hardwired 34 to the FMU 30 and produce analog or digital signals. Sensor signals are received, in their original format by the FMU 30 as throughput, and digitized for digital transmission via the RF link 29 that exists between the two modules 23, 30 via their respective RF transceivers 28 and 36. The digitized throughput signals are transmitted from the FMU 30 and received by the MMU 23 for input to the controller unit 21.

In this embodiment the FMU 30 is directly connected by wires 32 to one or more field electromechanical control devices, such as valves 31 and master valves 33, for controlling water flow from one or all of the water control valves.

Generally, electromechanical control devices such as MCV's and RCV's are those devices that are switched to change the state of the irrigation system, such as actuators, solenoids, relays, valves and servomotors. Further, in this embodiment the FMU 30 is also directly connected by wire 34 to one or more field sensor devices 35. Generally, field sensors are devices that measure field or operating conditions, such as those used to measure liquid flow, pressure or liquid level, atmospheric or weather related conditions or soil moisture content, as well as line current and battery charge.

Figure 6:
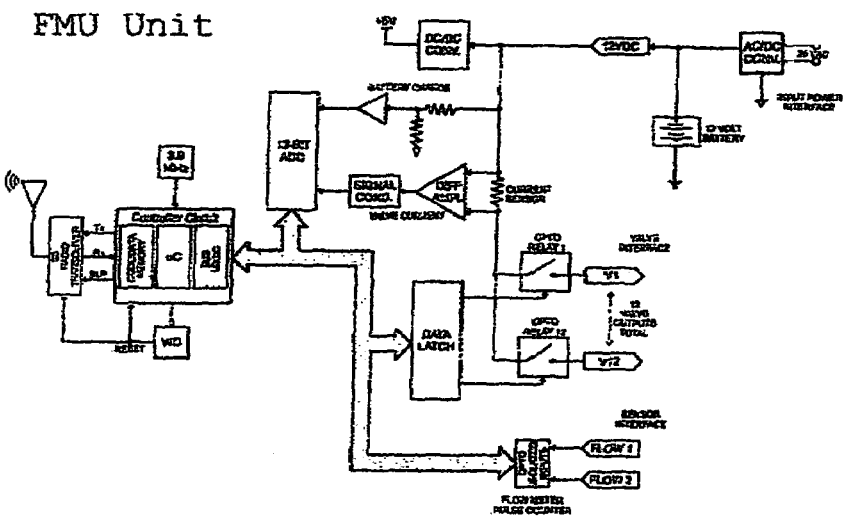
FIG. 6 is an electrical representation of the circuitry of the MMU and FMU.
Figure 6:
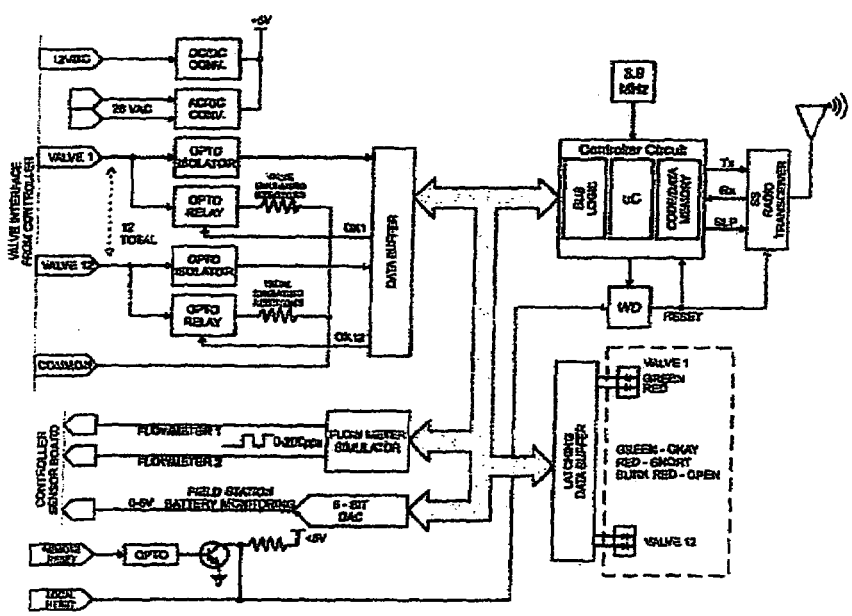

The FMU 30 and MMU 23 are preferably implemented with solid-state microprocessor circuitry including solid-state memory, an A/D converter and a wireless digital RF transceiver that will be apparent to those of skill in the art. FIG. 6 shows the preferred electronic schematic of the MMU 23 and FMU 30. This shows the best mode of the invention but is not to limit the present invention to a single electronic means of communicating between two distant devices without the use of wires.

AC or DC electrical current can be used to power one or both of the modules. In this embodiment, DC current from a battery 39 in the field powers the FMU 30. Because the WSCXS provides for a wireless link to field components, use of DC battery 39 power for the field components, the FMU 30, field sensors 35 and valves 31 is usually desirable. Where DC battery current is used on the FMU, a field electromechanical control device or a field sensor, the WCSCX is preferably also used to monitor the charge level of the battery. DC battery power levels can be monitored and subsequently reported back to the user or to MMU 23, which then reports the condition to a user. In the present example the WSCXS may relay an analog signal representing the battery status condition to the irrigation controller, if the feature may be implemented on the existing controller device 21. This feature enables the user to monitor battery function and replace the battery before it is completely depleted.

Supplemental functionality is that functionality beyond that which is provided by an existing controller unit. Such functionality may include the addition of supplemental sensors 42 that were not previously available or that the existing controller is incapable of operating. Such functionality may also include the addition of supplemental electromechanical control devices 44 that were not previously available or that the existing controller is incapable of operating. Supplemental functionality may also include implementing algorithms, such as watering cycles, that the existing controller is incapable of executing.

In the preferred embodiment a re-programmable firmware 40 is used to allow easy implementation of programming protocols customized for integration with a given model of existing controller and for implementing programming protocols for supplemental sensors, supplemental electromechanical devices, or methods of irrigation. The appropriate programming of the firmware 40 to implement the supplemental controller function of the WSCXS for operating these supplemental devices or methods may be created on another computer then uploaded to the firmware.

The supplemental functionality of the WSCXS may be integrated with the existing controller unit if the architecture and command protocol of the existing controller unit allows it. For example if the existing controller has a general shut-off command that can be invoked, the supplemental controller function might signal this command to the existing controller in response to a sensor signal that is otherwise incompatible with the existing controller. For example, if the WSCXS was programmed to operate with a sensor that measures water flow rates, to determine whether a minor or catastrophic line break has occurred, or to measure electrical current resistance in a field valve wire lead, to determine whether an open or short circuit condition exists, the WSCXS 20 may generate a signal to the existing controller evoking the general shut-off fault command, causing the existing controller to shut off the irrigation system.

Alternatively the supplemental controller function can be partially integrated with the existing controlled. For example the supplemental controller of the WSCXS might be programmed to send a signal to the existing controller unit to cause it to respond appropriately by mimicking an analogous fault condition that the existing controller was capable of executing. For example, when the WSCXS is used with an existing controller that has an existing rain sensor protocol, to cause the irrigation system to shut off during rain, the WSCXS can be programmed to take advantage of this. Were a supplemental sensor 42 to be employed, a sensor that could not otherwise be implemented by the existing controller, the WSCXS could be programmed to signal the existing controller that a rain condition exists.

In this manner the WSCXS may be programmed to respond when it receives a signal from an advanced sensor requiring that the system be shut off, for example, when wiring resistance had exceeded limits or other conditions, under these conditions the WSCXS could signal the existing controller that it was raining and report the true condition to a user. As a further illustration, a sensor may be provided that can detect a prohibitively high flow rate of water, indicating a broken valve or pipe. The WSCXS 20 acting as a supplemental controller may also return a signal to the existing controller that it is raining, resulting in the desired action because the existing controller will then shut off the irrigation system.

The WSCXS may also be used to implement a different program than the existing controller was designed to execute. For example the WSCXS could implement a more sophisticated irrigation program in response to a standard command signal from the existing controller unit to initiate a single or multiple watering cycles at specified interval to minimize water run-off and waste. In response, the WSCXS 20 might send a different corresponding signal to implement the supplemental field electromechanical devices 44 or even electromechanical devices 31 that the existing controller unit is designed to otherwise control.

Where an irrigation programming function cannot be adapted to be used with the existing controller unit at all the WCSCX may be programmed to independently control the irrigation by replacing or supplementing the commands of an existing irrigation controller without interaction with that existing controller.

When the WSCXS is used to provide additional or supplemental functionality, to function as a supplemental controller, the WSCXS preferably uses re-programmable firmware 40 to store embedded programming. When a new or alien field sensor, field electromechanical control device or method of irrigation is introduced into the irrigation system the firmware may then simply be upgraded to accommodate the new field sensor, field electromechanical control device or method of irrigation. Again using a water flow rate sensor by way of example, a user may wish to add a supplemental functionality by using a water flow rate sensor that the existing controller was not designed to operate. The firmware 40 of the WSCXS 20 would be programmed to execute a method and protocol for operating and responding to the sensor data inputs. This new programming can be implemented by simply upgrading the firmware programming.

The following are several examples of implementing supplemental functionality of a hydraulic system method that can be implemented by the WSCXS 20.

The WSCXS may be programmed with the steps of having the MMU 23 monitor and store water flow rate data for one or more watering cycles from a flow rate sensor. The WSCXS 20, acting as a supplemental controller, can be programmed to calculate the average flow rate and based on this, trip rates, which are abnormal rates of water flow that indicate trouble conditions. Thereafter when a level of water flow is reached during a cycle that exceeds the trip rate, the WSCXS 20 as a supplemental controller may issue a shutdown of a component and/or report an alarm condition. In this example if a high rate of water flow is detected beyond that of the trip rate, indicating a broken valve or pipe, the MMU 23 may report the condition and signal the FMU to shut off a valve or the whole system. If the sensor detected a low rate of water flow, below a trip rate, indicating a blockage, the MMU 23 can likewise report the condition and signal the FMU 30 to shut off a valve or the whole system.

The WSCXS 20 might also be configured to measure the electric current or voltage of the respective parts of the system, by methods that will be apparent to those of skill in the art, to monitor the condition and status of the electromechanical devices and sensors of the irrigation system. For example if a valve draws an excessive amount of current it may indicate that the valve is not fully opening because of a short circuit or is otherwise impaired; if a valve is not drawing any current at all this may indicate a broken connection to that valve. This power monitoring function of the WSCXS 20 can be used to modify an existing irrigation system to allow monitoring of the condition of the valve wire circuitry and faults in that irrigation system.

Figure 3:
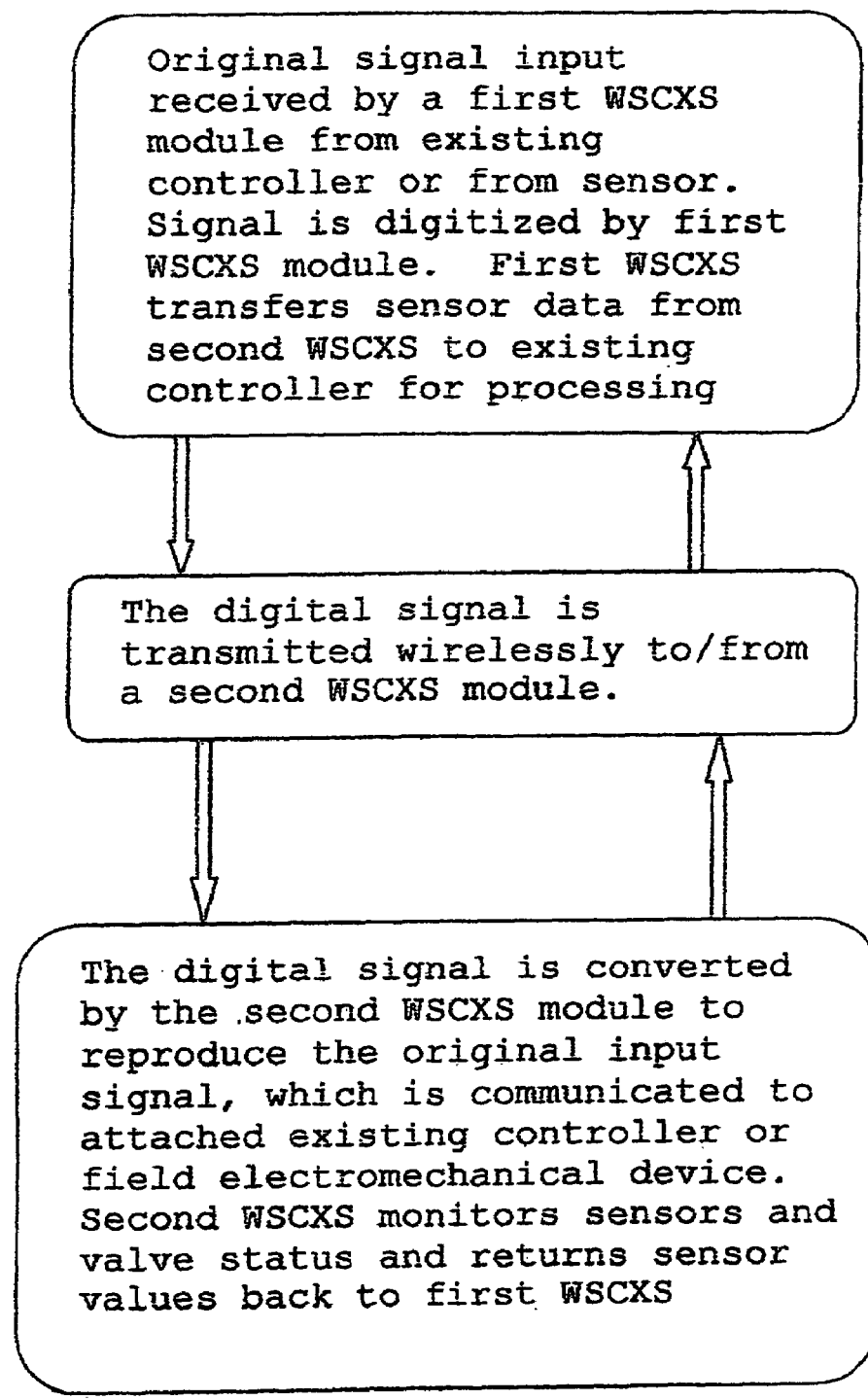
FIG. 3—This figure is a flow chart of the full duplex communication between the MMU and the FMU.
Figure 4:
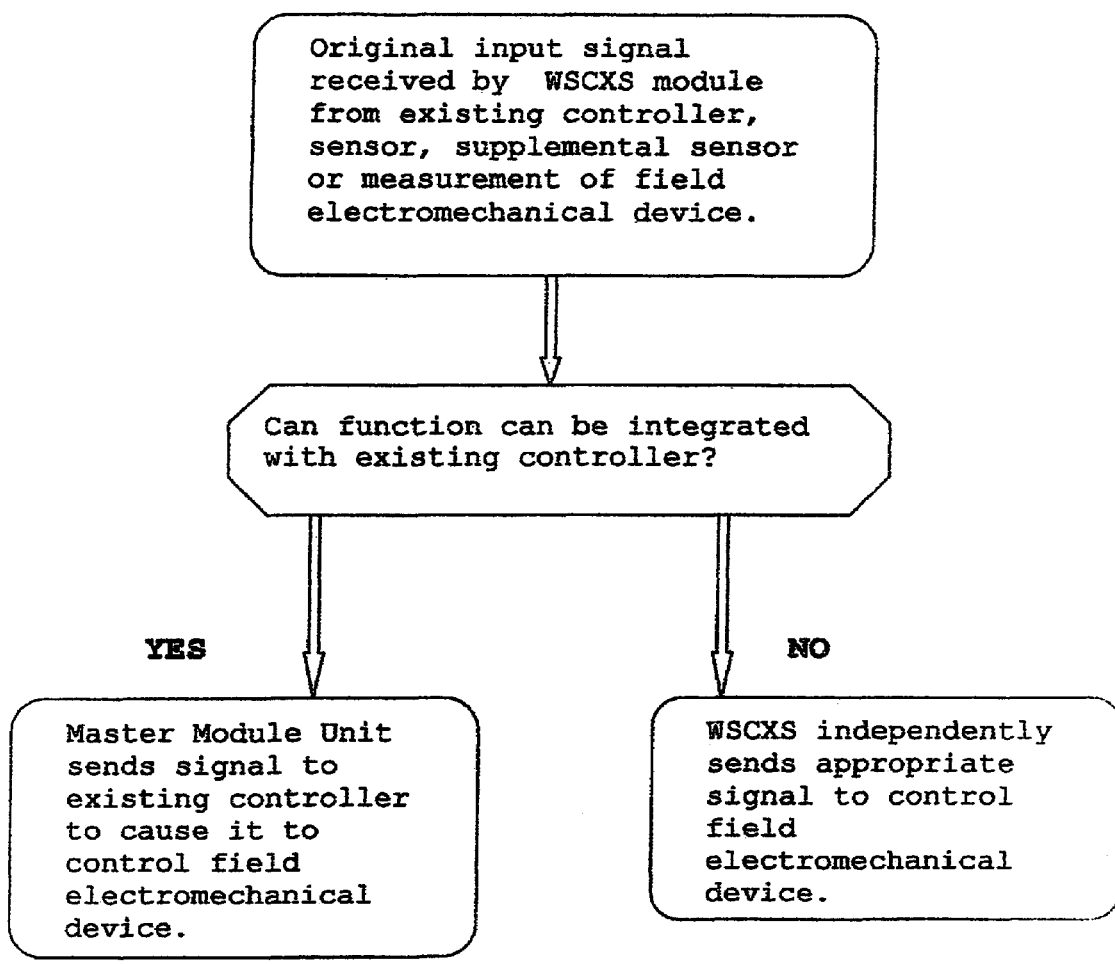
FIG. 4—This figures is a flow chart that shows how signal of non-compatible devices are routed.

Referring to FIGS. 3 and 4, flow charts of general methods of the present invention are shown. References to components are in FIG. 2.

FIG. 3 shows the method of the apparatus of FIG. 2. A original signal is received by first a WSCXS module, the MMU 23 or FMU 30 from the existing controller 21 or a sensor, 9, 35. The signal is digitized by the first WSCXS module and transmitted wirelessly to the other, second WSCXS module over RF link 29. The digital signal is converted by the second WSCXS module to reproduce the original signal, which is then communicated to an attached existing controller or to a field electromechanical device.

FIG. 4 shows a method of the apparatus of FIG. 2, showing possible integration of the controller 21 when implementing supplemental functionality. An original signal received by a WSCXS module from an existing controller, or from a sensor or supplemental sensor. If the desired function can be integrated with existing controller the MMU sends a signal to the existing controller to cause it to transmit an appropriate command to control a field electromechanical device. The WSCXS then transmits that appropriate signal to control field electromechanical device. If the MMU cannot be used to send an appropriate command, or if otherwise desired, the WSCXS is programmed to directly send an appropriate signal to control field electromechanical device.

Figure 5:
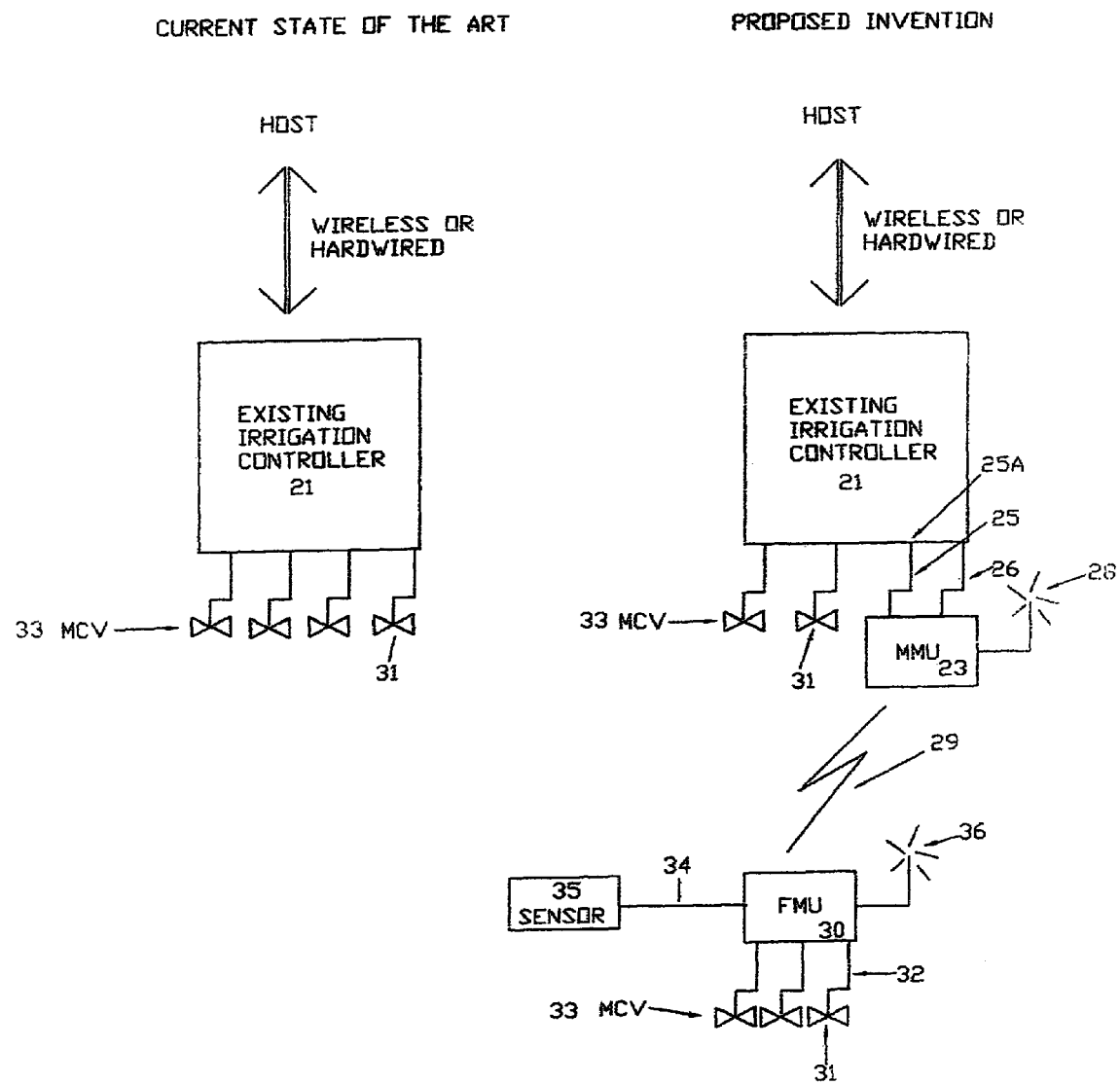
FIG. 5—This figure is a comparison of the current state of the art and the invention as the existing controller is controlled by a host computer and the expansion capabilities of the current invention.

Referring to FIG. 5, this figure shows how the prior art differs from the proposed invention. The prior art shows hardwired connections to sprinkler valves 31 and 33, where the proposed invention links the existing controller 21 to valves 31 and sensor 35 through wireless connections.

The WSCXS may be used with most or all irrigation systems, such as agricultural, landscape, golf course irrigation systems, as well as irrigation systems for native vegetation or habitat restoration parks or sports play fields. The WSCXS may also be used with other hydraulic systems such as public water transfer systems, oil, gas or petrochemical transfer systems. Any liquid, such as water or petrochemicals, that is transferred or moved through pipes of any size employing an electrical control system can be monitored and controlled wirelessly by retrofitting or adapting the WSCXS the control system and as a means of eliminating hardwire connections.

It will be appreciated that the invention has been described above with reference to certain examples or preferred embodiments as shown in the drawings. Various additions, deletions, changes and alterations may be made to the above-described embodiments and examples without departing from the intended spirit and scope of this invention.

Accordingly, it is intended that all such additions, deletions, changes and alterations be included within the scope of the following claims.

What is claimed is:

1. A Wireless Sensor and Control Transmitter Subsystem for a hydraulic system controlled by an existing controller unit, consisting:
    a master module unit having electronic circuitry that interfaces with an existing hydraulic system controller and also communicates wirelessly with one or more field module unit(s), said field module unit further having electronic circuitry that communicates with one or more field electromechanical control devices or sensors,
    wherein the circuitry of said master module unit is capable of generating digital command signals, wirelessly transmitting said digital signals to said field module unit, said field module unit circuitry is capable of regenerating said digital command signals received from said master module unit to recreate said controller command signal and of transmitting said recreated signal to the field electromechanical control devices or sensors, and
    the circuitry of said field module unit is capable of converting signals from said electromechanical control devices or sensors into digital signals and wirelessly transmitting said digital signals to said master module unit, and further said master module unit circuitry is capable of converting the digital signals received from said field module unit to reproduce the electromechanical control devices or sensors signals and transmit them to the controller in their originally received form or format.

2. A Wireless Sensor and Control Transmitter Subsystem for a hydraulic system controlled by an existing controller unit as in of claim 1 where signals from said controller to said electromechanical devices and sensors have similar interface protocols.

3. A Wireless Sensor and Control Transmitter Subsystem for a hydraulic system controlled by an existing controller unit as in claim 1 where signals from said controller to said electromechanical devices and sensors have dissimilar interface protocols.

4. A Wireless Sensor and Control Transmitter Subsystem for a hydraulic system controlled by an existing controller unit as in claim 1 customized for use with an existing controller that further includes electronic circuitry that provides supplemental functionality for the hydraulic system that said existing controller cannot implement.

5. A Wireless Sensor and Control Transmitter Subsystem for a hydraulic system controlled by an existing controller unit as in claim 4 where said supplemental functionality of said supplemental controller is retrofitted to said controller unit.

6. A Wireless Sensor and Control Transmitter Subsystem for a hydraulic system controlled by an existing controller unit as in claim 4 where said supplemental functionality comprises implementing at least one supplemental field electromechanical control device.

7. A Wireless Sensor and Control Transmitter Subsystem for a hydraulic system controlled by an existing controller unit as in claim 4 where said supplemental functionality comprises implementing at least one supplemental sensor.

8. A Wireless Sensor and Control Transmitter Subsystem for a hydraulic system controlled by an existing controller unit as in claim 7 where said supplemental functionality of the system includes receiving status signals from said supplemental sensor is selected from the group consisting of those sensors that measure liquid flow, liquid pressure, liquid level, atmospheric conditions, soil moisture content, water-borne contaminants, electric current and electrical voltage and relaying said status signals to said controller.

9. A Wireless Sensor and Control Transmitter Subsystem for a hydraulic Previously system controlled by an existing controller unit as in claim 4 where said supplemental functionality comprises electrical circuitry that measures the electrical state of said supplemental field electromechanical device communicating said state to said controller.

10. A Wireless Sensor and Control Transmitter Subsystem for a hydraulic system controlled by an existing controller unit as in claim 1 where said field module unit is capable of transmitting an acknowledgement message to said master module unit upon the successful receipt of said signals transmitted by said master module unit, and where said master module unit is capable of transmitting an acknowledgement message to said field module unit upon the successful receipt of said signals transmitted by said field module unit.

11. A Wireless Sensor and Control Transmitter Subsystem for a hydraulic system controlled by an existing controller unit as in claim 1 where said master module unit will retransmit said signals to said field module unit until said acknowledgement transmission signal has been received from said field module unit and where said field module unit will retransmit said signals to said master module unit until said acknowledgement transmission signal has been received from said field module unit.

12. A Wireless Sensor and Control Transmitter Subsystem for a hydraulic system controlled by an existing controller unit as in claim 1 where said master module unit establishes connection therewith said controller through an interface medium selected from the group comprising wire terminal strip, wire connector lead or connection points, cable connector pins on an electronic main or mother board, electronic boards that are integrated into said existing controller unit for the purpose of conveying controller actions to field outputs or sensor inputs, output driver cards, and add-on interface modules.

13. A method for implementing a Wireless Sensor and Control Transmitter Subsystem controlling a hydraulic system controlled by an existing controller unit, consisting the steps of:
  providing a master module unit having electronic circuitry that interfaces with an existing hydraulic system controller unit and also communicates wirelessly with a field module unit, said field module unit further having electronic circuitry that communicates with one or more field electromechanical control devices or sensors,
  transforming command signals from said controller unit by using the circuitry of said master module into digital signals and wirelessly transmitting said digital signals to said field module unit, said field module unit circuitry is capable of retransforming said digital command signals received from said master module unit to reproduce the controller command signal and of transmitting the reproduced signal to the field electromechanical control devices or sensors, and
  converting signals from said electromechanical control devices or sensors using circuitry of said field module unit into digital signals and wirelessly transmitting said digital signals to said master module unit, said master module unit circuitry is capable of converting said digital signals received from said field module unit to reproduce and transmit them to said controller, and
  connecting said master module unit to said existing hydraulic system controller and connecting said field module unit to said field electromechanical devices or sensors.

14. A method for implementing a Wireless Sensor and Control Transmitter Subsystem controlling a hydraulic system controlled by an existing controller unit of claim 13 further consisting supplemental functionality including a system customized for use with said existing controller that includes electronic circuitry that provides said supplemental functionality for the hydraulic system that said existing controller can not implement.

15. A method for implementing a Wireless Sensor and Control Transmitter Subsystem controlling a hydraulic system controlled by an existing controller unit of claim 14 where said supplemental functionality of the supplemental controller is retrofitted with said controller unit.

16. A method for implementing a Wireless Sensor and Control Transmitter Subsystem controlling a hydraulic system controlled by an existing controller unit of claim 14 where said supplemental functionality comprises implementing at least one supplemental field electromechanical control device.

17. A method for implementing a Wireless Sensor and Control Transmitter Subsystem controlling a hydraulic system controlled by an existing controller unit of claim 14 where said supplemental functionality comprises implementing at least one supplemental sensor.

18. A method for implementing a Wireless Sensor and Control Transmitter Subsystem controlling a hydraulic system controlled by an existing controller unit of claim 17 where the supplemental functionality of the system includes the steps of receiving signals from field sensors selected from the group consisting of those sensors that measure liquid flow, liquid pressure, liquid level, liquid temperature, liquid or air borne particulates, atmospheric conditions, soil moisture content, water-borne contaminants or particulates, electrical conductivity, current and electrical voltage and communicating said signals to said controller.

19. A method for implementing a Wireless Sensor and Control Transmitter Subsystem controlling a hydraulic system controlled by an existing controller unit of claim 14 where said supplemental functionality comprises electrical circuitry that measures the electrical state of at least one said supplemental field electromechanical device relaying said state to said controller.

20. A method for implementing a Wireless Sensor and Control Transmitter Subsystem controlling a hydraulic system controlled by an existing controller unit of claim 13 where said field module unit is capable of transmitting an acknowledgement message to said master module unit upon the successful receipt of said signals transmitted by said the master module unit, and where said master module unit is capable of transmitting an acknowledgement message to said field module unit upon the successful receipt of said signals transmitted by said field module unit.

21. A method for implementing a Wireless Sensor and Control Transmitter Subsystem controlling a hydraulic system controlled by an existing controller unit of claim 13 where said master module unit will retransmit said signals to said field module unit until said acknowledgement transmission signal has been received from said field module unit and where said field module unit will retransmit said signals to said master module unit until said acknowledgement transmission signal has been received from said field module unit.

22. A method for implementing a Wireless Sensor and Control Transmitter Subsystem controlling a hydraulic system controlled by an existing controller unit of claim 13 where said master module unit and said field module unit(s) communicate by wireless technology means that includes a variety of current and future contemporary wireless technologies, devices and/or communication interface protocols.

23. A method for implementing a Wireless Sensor and Control Transmitter Subsystem controlling a hydraulic system controlled by an existing controller unit of claim 13 where signals from said controller to said electromechanical devices and sensors have similar communication interface protocols.

24. A method for implementing a Wireless Sensor and Control Transmitter Subsystem controlling a hydraulic system controlled by an existing controller unit of claim 13 where signals from said controller to said electromechanical devices and sensors have dissimilar communication interface protocols.

* * * * *

UNITED STATES PATENT AND TRADEMARK OFFICE
CERTIFICATE OF CORRECTION

| | |
|---|---|
| PATENT NO. | : 7,050,887 B2 |
| APPLICATION NO. | : 10/746994 |
| DATED | : May 23, 2006 |
| INVENTOR(S) | : Raymond Alvarez |

It is certified that error appears in the above-identified patent and that said Letters Patent is hereby corrected as shown below:

Col. 12, lines 55-60, should read,

Claim 9 : A Wireless Sensor and Control Transmitter Subsystem for a hydraulic [Previously] system controlled by an existing controller unit as in claim 4 where said supplemental functionality comprises electrical circuitry that measures the electrical state of said supplemental field electromechanical device communicating said state to said controller.

Signed and Sealed this

Fourth Day of March, 2008

JON W. DUDAS
*Director of the United States Patent and Trademark Office*